Aug. 29, 1967  J. C. DONAHUE  3,338,440

FARM IMPLEMENT CARRIER

Filed Dec. 8, 1965  3 Sheets-Sheet 2

INVENTOR.
James C. Donahue
BY John A. Hamilton
Attorney.

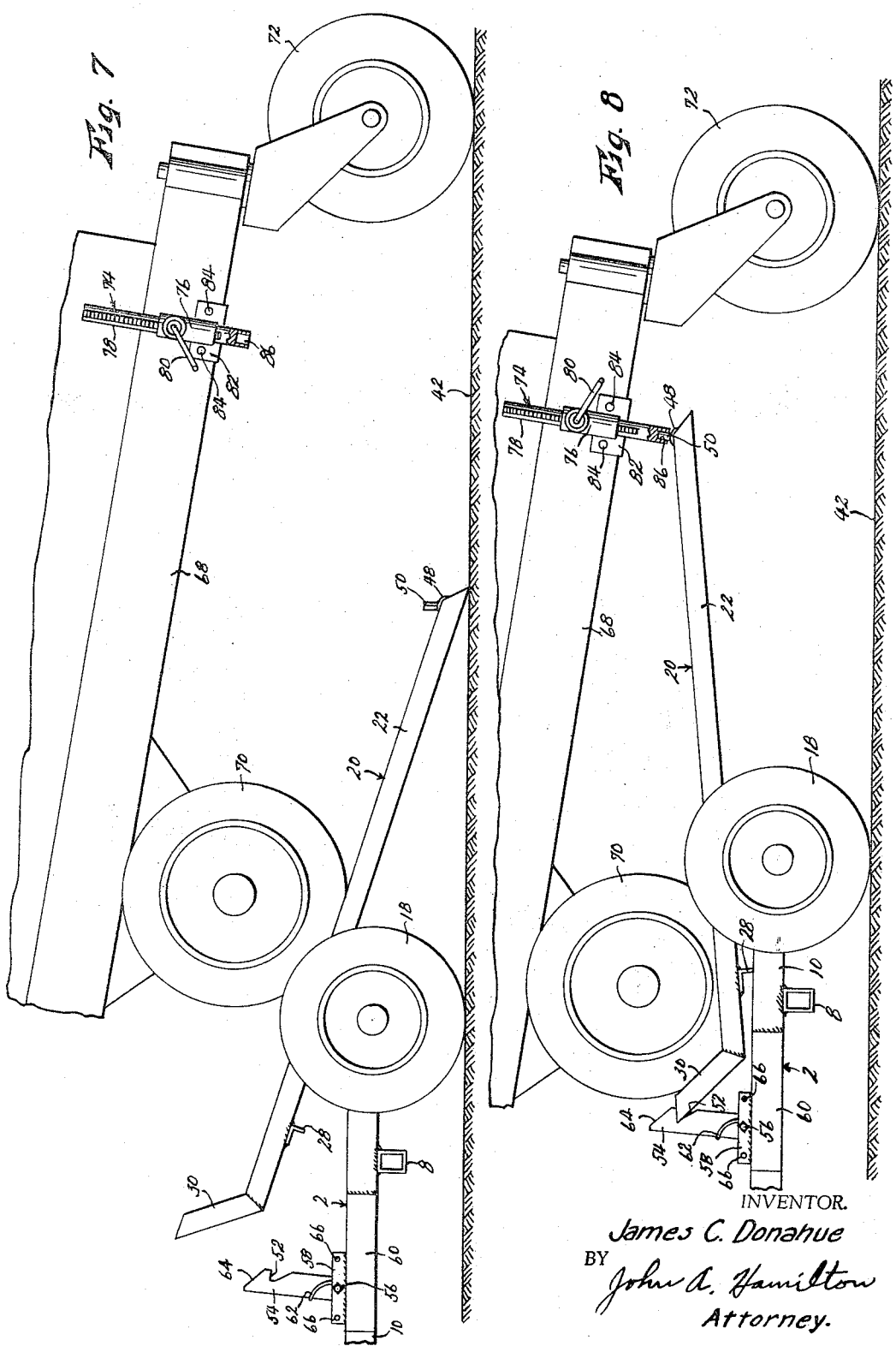

United States Patent Office 3,338,440
Patented Aug. 29, 1967

3,338,440
FARM IMPLEMENT CARRIER
James C. Donahue, Durham, Kans. 67438
Filed Dec. 8, 1965, Ser. No. 512,451
10 Claims. (Cl. 214—506)

ABSTRACT OF THE DISCLOSURE

This application discloses a carrier or transport for wheeled farm implements or the like, said carrier comprising a wheeled frame having a vertically movable ramp pivoted thereto on a horizontal transverse axis, one end of said ramp being engageable with the ground whereby a wheeled implement may be moved up said ramp to traverse said pivotal axis, whereupon the ramp is pivoted by the weight of the implement to an elevated position above the ground, latch means for releasably holding said ramp in its elevated position, and means carried at the end of the ramp normally engaging the ground and operable to elevate the implement relative to that end of the ramp.

---

This invention relates to new and useful improvements in carrier or transport trailers or other carrier vehicles, and has particular reference to a carrier for transporting farm implements of various types from place to place. As shown, the device comprises a wheeled trailer adapted to be attached to and be towed by a pick-up truck or other towing vehicle, and has been especially designed to carry a farm mowing and windrowing machine commonly known as a "swather," although it will be readily apparent that its inventive principles are not restricted to this particular usage.

The principal object of the present invention is the provision of a farm implement carrier of the class described which carries the implement elevated above the ground on a wheeled frame, and which is so designed that the implement may be placed thereon or removed therefrom very quickly, easily and conveniently.

Another object is the provision of a farm implement carrier of the character described in which much of the work necessary to mount the implement on or remove it from the carrier may be performed by the implement itself, if said implement is of the power-propelled type.

Other objects are simplicity and economy of construction, efficiency and dependability of operation, and adaptability, with minor adaptations of size and proportions, to carry implements of many different types.

Figure 1:
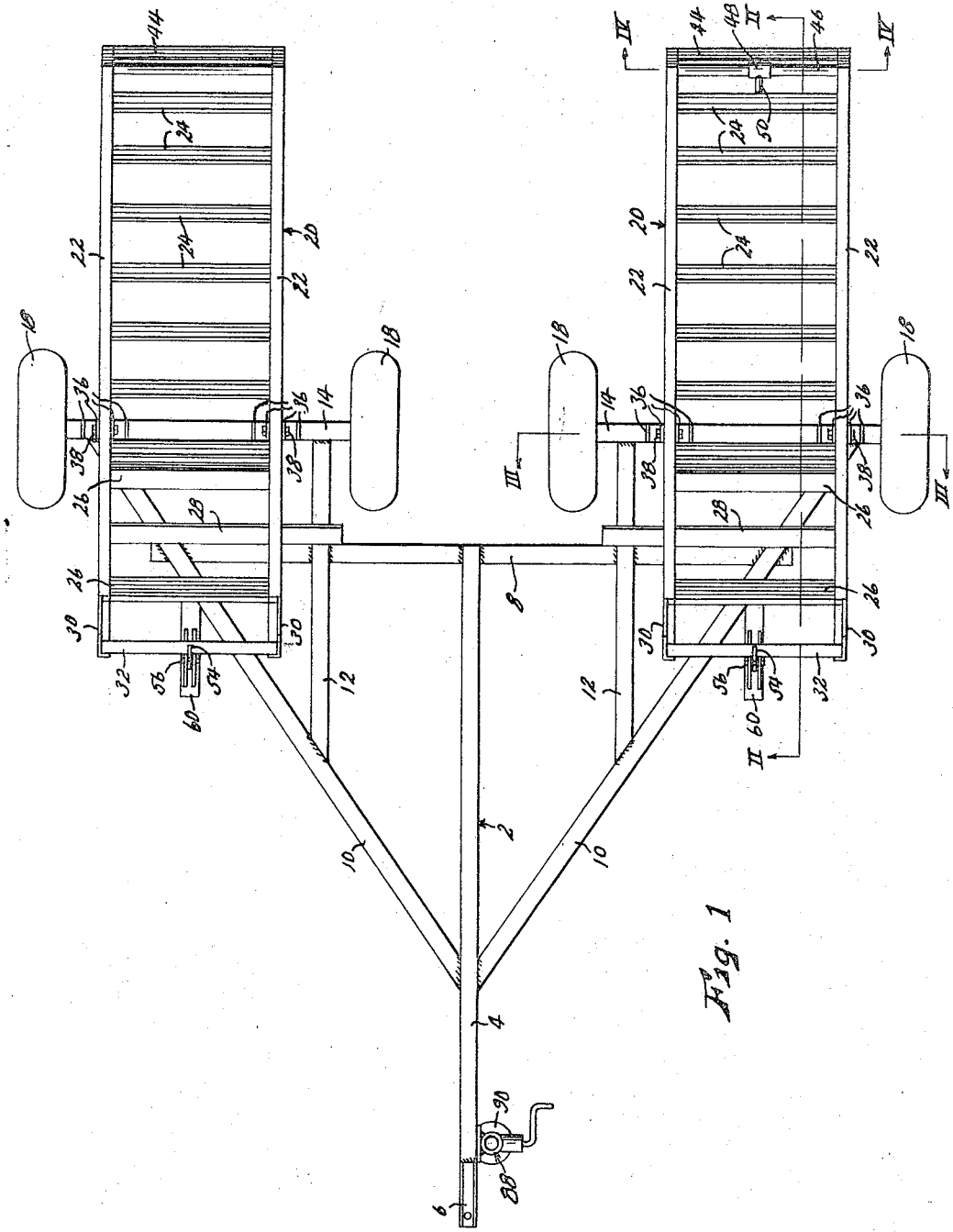
Figure 2:
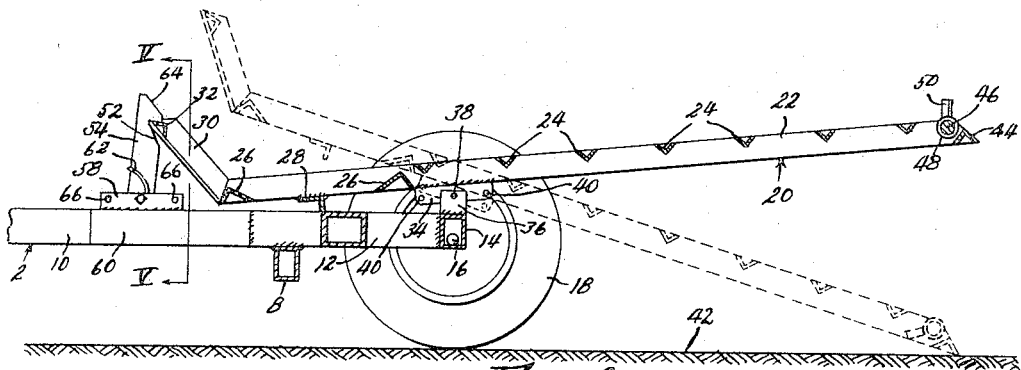
Figure 3:
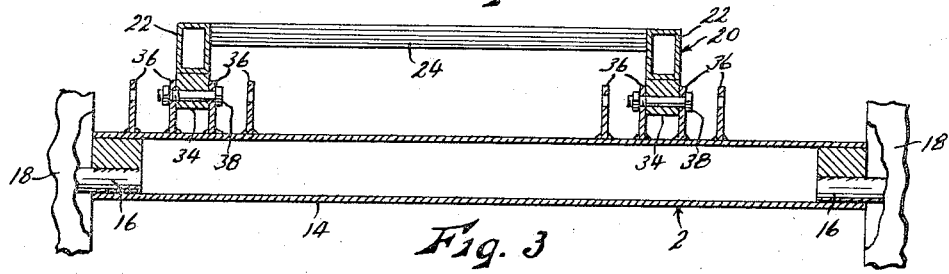
Figure 4:
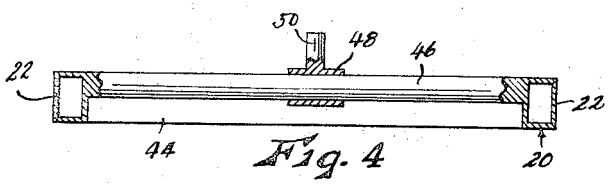
Figure 5:
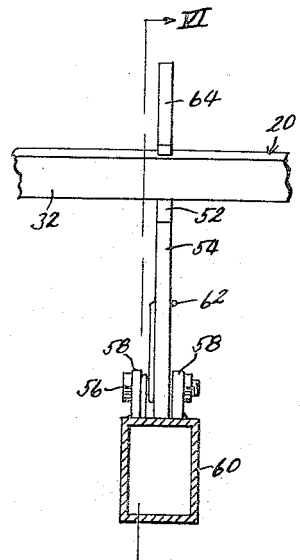
Figure 6:
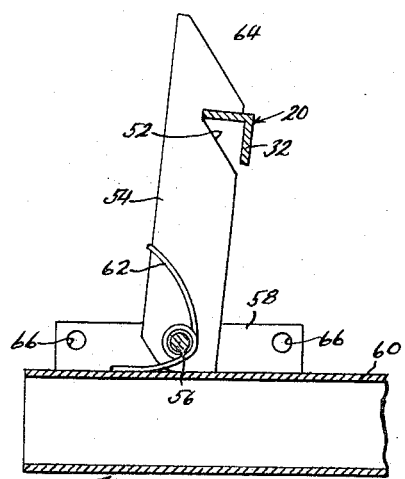

With these objects in view, as well as other objects which will appear in the course of the specification, reference will be had to the accompanying drawing, wherein:

FIG. 1 is a top plan view of a farm implement carrier embodying the present invention, with the loading ramps thereof shown in their raised positions, FIG. 2 is an enlarged, fragmentary sectional view taken on line II—II of FIG. 1, showing one of the loading ramps in its raised position in solid lines, and in its lowered position in dotted lines, FIG. 3 is an enlarged, fragmentary sectional view taken on line III—III of FIG. 1, FIG. 4 is an enlarged sectional view taken on line IV—IV of FIG. 1, FIG. 5 is an enlarged fragmentary sectional view taken on line V—V of FIG. 2, FIG. 6 is a fragmentary sectional view taken on line VI—VI of FIG. 5, FIG. 7 is a fragmentary side elevational view of the carrier, with a farm implement, shown fragmentarily, at an intermediate stage of being loaded thereon, and FIG. 8 is a view similar to FIG. 7, but showing the implement at another stage of the loading operation.

Like reference numerals apply to similar parts throughout the several views and the numeral 2 applies generally to a trailer frame which is generally planar and horizontal, and which as shown is formed of hollow box beams. It includes a tongue 4 having at its forward end a suitable hitch member 6 for attaching the frame to a pick-up truck or other towing vehicle, and a lateral cross bar 8 affixed at its midpoint to the rearward end of said tongue. A pair of rearwardly divergent bars 10 are affixed at their forward ends to tongue 4 just behind hitch 6, are affixed intermediate their ends respectively to the outer ends of cross bar 8, and extend rearwardly from said cross bar. A bar 12 is affixed at its forward end to an intermediate point of each diagonal bar 10, and extends rearwardly therefrom, being affixed intermediate its ends to cross bar 8 and extending rearwardly from said cross bar. Affixed to the rearward end of each diagonal bar 10, and to the rearward end of the associated bar 12, is an axle bar 14. Said axle bars are coaxial and horizontal, are longitudinally spaced apart, and extend laterally to the direction of travel of the device. Affixed in each end of each axle bar 14 is an axle 16 (see FIG. 3), on the extended end of which a ground-engaging wheel 18 is rotatably mounted.

Mounted on each of axle bars 14, between the wheels 18 thereof, is an elongated ramp 20 which extends parallel to the direction of travel of the device. Each of said ramps consists of a pair of generally parallel side rails 22 connected rigidly together by a series of parallel, spaced apart transverse tread bars. The tread bars for the major portion of the lengths of the ramps are designated by the numeral 24, and their upper surfaces are substantially flush with the upper edges of the side rails. At the forward ends of the side rails, there are a pair of tread bars 26, and a third tread bar 28 midway between bars 26, which are set lower between side rails 22 to form a depressed wheel "well" for a purpose which will presently be described. The extreme forward end portions 30 of side rails 22 are angled upwardly and forwardly as shown, and are connected at their upper ends by a horizontal transverse cross bar 32 which serves both as a bumper and as a latch bar, as will be described.

Each ramp 20 is pivoted for vertical movement on a horizontal transverse axis intermediate its ends above and parallel to its associated axle bar 14, each side rail 22 of each ramp having affixed to the lower edge thereof a lug 34 disposed selectively between any adjacent pair of upstanding ears 35 welded to axle bar 14, and secured by a pivot bolt 38 extending through matching perforations in said lugs and said ears, as best shown in FIG. 3. By positioning lugs 34 between various pairs of said ears, the transverse spacing between ramps 20 may be adjusted to the tread width of the front wheels of the farm implement to be carried thereby. It will be noted also that each lug 34 is provided with a series of holes 40 (see FIG. 2) which are spaced apart longitudinally of the ramps. By inserting bolts 38 selectively through various holes 40, the ramps may be adjusted forwardly or rearwardly with respect to their pivotal axes, for a purpose which will presently appear.

The rearward end of each ramp normally tends to pivot downwardly by gravity to rest on the ground 42, as shown in FIG. 7 and in dotted lines in FIG. 2, in order that the front wheels of a farm implement may be moved onto and upwardly therealong, and may be pivoted upwardly to and slightly past a horizontal position, as shown in FIGS. 2 and 8. Each ramp is provided at its extreme rearward end with a rigid cross bar 44 providing an inclined surface facilitating the movement of implement wheels onto the ramps. At least one of the ramps is provided just forwardly of said rear cross bar 44 with a round rod 46 extending horizontally between and fixed to side rails 22. On said rod a short tubular sleeve 48 is rotatably and slidably mounted. Affixed to and extending radially from said sleeve is a short stud 50 for cooperating with a jack to be described below.

As each ramp 20 approaches its raised position as shown in FIGS. 2 and 8, it is secured in said raised position by the engagement of the cross bar 32 thereof in a notch 52 formed adjacent the upper end of a latch arm 54, the lower end of said latch arm being pivoted on a bolt 56 extending between a pair of ears 58 welded to a bar 60 affixed to and extending forwardly from the associated diagonal bar 10 of frame 2. Said latch arm is biased rearwardly to its operative position by a spring 62 carried on bolt 56, and has a sloping cam surface 64 at its upper end above notch 52. As each ramp is tilted forwardly, cross bar 32 engages cam surface 64 of its associated latch bar to pivot said latch bar forwardly against spring 62 until said cross bar is aligned with notch 52, whereupon said spring pivots said latch bar rearwardly to engage said notch over said cross bar, as best shown in FIGS. 5 and 6. Said latch bars may be released manually. Downward movement of the forward ends of the ramps is limited by the engagement of cross bars 28 thereof with the upper face of frame 2, particularly bars 10 and 12 of said frame. It will be noted in FIG. 1 that each cross bar 28 is extended outwardly from the inner side rail 22 of its ramp in order to move engagement thereof with frame bars 10 and 12 regardless of the particular ears 36 between which the ramp lugs 34 are mounted. It will be noted also that the pivot bolts 56 of the latch bars 54 may be inserted selectively through any of a plurality of holes 66 of ears 58, in order that latch bars 54 will cooperate properly with ramp cross bars 32 regardless of the particular holes 40 of ramp lugs 34 in which ramp pivot bolts 38 are inserted.

Referring next to FIGS. 7 and 8, the farm implement to be transported by the carrier is shown fragmentarily, being represented by a frame 68 supported by a pair of front wheels 70 (only one of which is shown) and one or more rear wheels 72, which may or may not be disposed directly in the line of travel of the front wheels. In the use of the carrier, latches 54 are released and the rearward ends of ramps 20 are lowered to the ground as in FIG. 7. Then, after first ascertaining that the spacing between the ramps is adjusted to the front wheel tread width of the implement, as previously described, and turning sleeve 48 on rod 46 so that stud 50 does not project above the ramp, as shown in dotted lines in FIG. 2, the front wheels 70 of the implement are driven up the ramps. Said front wheels may be dual wheels, and the ramps as shown are wide enough to accommodate dual wheels. If the implement is self-propelled, it may be driven up the ramps under its own power, or it could be towed if it is not self-propelled.

As the implement wheels pass forwardly over pivot bolts 38 of the ramps, the weight of the implement pivots the forward ends of the ramps downwardly and their rearward ends upwardly, to the position shown in FIG. 8, in which they are engaged and secured by latches 54, as previously described. Wheels 70 are prevented from rolling off of the forward ends of the ramps by cross bars 32, serving as bumpers. Wheels 70 are prevented from rolling rearwardly along the ramps accidentally, as during transport, both by the fact that said ramps are now inclined downwardly and forwardly, and also by the fact that said wheels are engaged in the depressed "wells" formed by tread bars 26 and 28 of the ramps.

The carrier and implement then have the relative positions shown in FIG. 8, rear wheel 72 of the implement still resting on the ground either because the length of ramps 20 is less than the wheelbase dimension of the implement, as shown, or because the rear wheels are not aligned with the ramps. To elevate rear wheels 72 from the ground, there is provided a jack indicated generally by the numeral 74 adapted to be attached to frame 68 of the implement to be carried so as to be disposed above the rearward end of the ramp 20 carrying stud 50 at the stage of loading shown in FIG. 8. Nearly any type of farm implement has some portion on which the jack can be so located, especially since stud 50 can be adjusted laterally by sliding sleeve 48 along rod 46. Jack 74 can be of any of several types well known in the art, and is therefore not shown in detail in the drawing. Generally, however, it consists of a body member 76 in which is mounted a vertically extending post 78, said post being movable longitudinally in said body member by a gear mechanism carried in the body member and operable by a manual crank 80. The body member is fixed to a bracket 82 which may be mounted on implement frame 68, as by rivets 84. The lower end of post 78 is axially socketed, as at 86, to receive stud 50 therein, as shown in FIG. 8. Then, by turning crank 80, post 78 may be extended downwardly, whereby rear implement wheel 72 is elevated above the ground, and the implement is completely supported by the carrier for easy and convenient transportation from place to place. The weight of the implement may tend to lower the rearward ends of the ramps, but they are of course secured by latches 54. Unloading of the implement is accomplished by reversing the process described above, first operating jack 74 to lower rear implement wheel 72, to the ground, thereby releasing any pressure on latches 54, disconnecting said jack, releasing said latches manually, and moving front implement wheels 70 rearwardly along ramps 20, the rearward ends of the ramps being lowered to the ground as wheels 70 pass rearwardly over ramp pivots 38. A jack 88 may be provided adjacent the forward end of frame tongue 4 for supporting the frame in a horizontal position when the carrier hitch 6 is not connected to a towing vehicle. This jack is similar in all respects to jack 74, except that the lower end of the post thereof is provided with an enlarged ground-engaging foot 90.

It will be seen that if the center of gravity of the implement being carried is disposed forwardly from ramp pivot bolts 38, the weight of the implement will exert a downward force on hitch 6 of tongue 4, and hence on the towing vehicle, for example, a pick-up truck. A positive downward force on said hitch is desirable, in order to provide load for good traction of the truck wheels on the ground. On the other hand, too great a load on the hitch will unduly compress the rear suspension springs of the truck, and is not desirable. By inserting pivot bolts 38 in various of holes 40 of ramp lugs 34, the center of gravity of the vehicle may be shifted forwardly or rearwardly with respect to the bolt axis, to the end that a proper hitch load may be provided. A cursory examination of FIG. 8 might seem to indicate that the center of gravity of the implement is in fact disposed rearwardly from the ramp pivots, but the seeming contradiction results from the fact that the implement shown represents a swather, in which the cutter bar assembly and other heavy parts thereof are disposed forwardly from front wheels 70, often to the extent that the rearward end of frame 68 must be artificially counterweighted to keep rear wheel 72 on the ground. In carriers designed for implements having a more equal weight distribution between front and rear wheels, the pivotal axis of the ramps would be disposed relatively farther to the rear from the forward ends of the ramps. If no tongue loading is desired, as in trailers having vertically pivotal tongues, the frame 2 could be provided with steerable front wheels spaced forwardly from wheels 18, with the ramps so disposed that the center of gravity of the implement being carried would be disposed between the front and rear trailer wheels. So long as the center of gravity of the implement is disposed forwardly of bolts 38, there will be no upward load on latches 54, and therefore said latches could be omitted if all other proportions are correct. However, said latches are desirable both in the event the center of gravity of a particular implement might fall to the rear of pivots 38, and also to prevent accidental tilting of the ramps during transport.

For many implements, ramps 20 could be combined into a single ramp of greater width, within the purview of the present invention. For this reason, ramps 20 may be designated as a single ramp divided into two sections. However, the swathers for which the carrier actually shown was designed often include a hay conditioning apparatus disposed forwardly from and midway between the front wheels thereof, and extending close to the ground. A single wide ramp would interfere with such a hay conditioning apparatus during the loading operation.

While I have shown and described a specific embodiment of my invention, it will be readily apparent that all of the modifications described above, as well as other minor changes of structure and operation, could be made without departing from the spirit of the invention as defined by the scope of the appended claims.

What I claim as new and desire to protect by Letters Patent is:

1. A farm implement carrier comprising:
    (a) a wheeled frame,
    (b) an elongated ramp having forward and rearward ends pivoted to said frame on a horizontal axis transverse to said ramp, intermediate its ends, and above the ground-engaging level of the wheels of said frame, said ramp being pivotal to an inclined position wherein the rearward end thereof engages the ground, whereby the front or rear wheels of an implement to be carried may be rolled upwardly along said ramp to a point at the opposite side of the pivotal axis of said ramp, whereupon the weight of said implement pivots said ramp to a raised, generally horizontal position limited by engagement of said ramp with suitable stops carried by said ramp, said ramp being so proportioned and positioned that the other wheels of said implement do not engage said ramp, and
    (c) means carried by said ramp at the rearward end thereof and operable to engage and elevate said implement with respect to the rearward end of said ramp.

2. A farm implement carrier as recited in claim 1 with the addition of:
    (a) means for adjusting the pivotal axis of said ramp forwardly or rearwardly with respect to said ramp, whereby the center of gravity of said implement when loaded on said carrier as recited may be disposed forwardly of said pivotal axis.

3. A farm implement carrier as recited in claim 1 with the addition of:
    (a) latch means for engaging and releasably securing said ramp in said generally horizontal position.

4. A farm implement carrier as recited in claim 1 with the addition of:
    (a) means for adjusting the pivotal axis of said ramp forwardly or rearwardly with respect to said ramp, whereby the center of gravity of said implement when loaded on said carrier as recited may be disposed forwardly of said pivotal axis, and
    (b) latch means for releasably securing said ramp in said generally horizontal position.

5. A farm implment carrier as recited in claim 1 wherein said frame is supported only by coaxial ground-engaging wheels at its rearward end and by a hitch member at its forward end adapted to be connected to a towing vehicle, the pivotal axis of said ramp being disposed generally in the vertical plane of the axis of said ground-engaging wheels, and with the addition of:
    (a) means for adjusting said ramp forwardly and rearwardly with respect to its pivotal axis whereby the center of gravity of an implement loaded on said carrier as recited may be disposed at variable distances forwardly of said pivotal axis, whereby the weight of said implement urges said ramp toward said generally horizontal position, and acting through said stop members and said frame, exerts a downward pressure on said hitch member.

6. A farm implement carrier as recited in claim 5 with the addition of:
    (a) latch members releasably securing said ramp in said generally horizontal position.

7. A farm implement carrier as recited in claim 1 wherein said ramp constitutes two separate laterally spaced apart ramp sections coaxially pivoted on said frame, the lateral spacing between said ramp sections being adjustable to accommodate them to variable tread spacings of the implement wheels to be supported thereby.

8. A farm implement carrier as recited in claim 1 wherein said ramp, in moving from said inclined position to said raised position, moves through and slightly past horizontal, so as to be inclined downwardly and forwardly when in said raised position, and wherein said ramp is provided at its forward end with a raised bumper preventing implement wheels from rolling forwardly off of said ramp.

9. A farm implement carrier as recited in claim 8, wherein the upper surface of said ramp is provided with a depressed wheel well for receiving and inhibiting rolling movement of implement wheels engaged therein, said well being disposed rearwardly of said bumper and forwardly from the pivotal axis of said ramp.

10. A farm implement carrier as recited in claim 1, wherein said means for elevating said implement relative to the rearward end of said ramp constitutes an extensible jack interposed between the rearward end of said ramp and a portion of said implement disposed immediately thereabove.

References Cited

UNITED STATES PATENTS 2,391,503  12/1945  Page.
2,463,744  3/1949  Clemens _____ 214—85

FOREIGN PATENTS 622,168  6/1961  Canada.

HUGO O. SCHULZ, *Primary Examiner.*